United States Patent
Mazzillo et al.

(10) Patent No.: US 12,529,599 B2
(45) Date of Patent: Jan. 20, 2026

(54) OPTOELECTRONIC APPARATUS

(71) Applicant: ams-OSRAM International GmbH, Regensburg (DE)

(72) Inventors: Massimo Cataldo Mazzillo, Hamburg (DE); Faina Esser, Regensburg (DE); Claus Jaeger, Regensburg (DE); Tim Boescke, Regensburg (DE)

(73) Assignee: ams-OSRAM International GmbH, Regensburg (DE)

( * ) Notice: Subject to any disclaimer, the term of this patent is extended or adjusted under 35 U.S.C. 154(b) by 588 days.

(21) Appl. No.: 17/907,195

(22) PCT Filed: Mar. 16, 2021

(86) PCT No.: PCT/EP2021/056700
§ 371 (c)(1),
(2) Date: Sep. 23, 2022

(87) PCT Pub. No.: WO2021/191003
PCT Pub. Date: Sep. 30, 2021

(65) Prior Publication Data
US 2023/0108848 A1 Apr. 6, 2023

(30) Foreign Application Priority Data
Mar. 24, 2020 (DE) .......................... 102020203805.8

(51) Int. Cl.
*G01J 3/36* (2006.01)
*G01J 3/02* (2006.01)
(Continued)

(52) U.S. Cl.
CPC .............. *G01J 3/36* (2013.01); *G01J 3/0259* (2013.01); *G01J 3/0291* (2013.01); *H10F 77/337* (2025.01); *H10F 77/50* (2025.01)

(58) Field of Classification Search
None
See application file for complete search history.

(56) References Cited

U.S. PATENT DOCUMENTS 8,610,225 B2  12/2013  Mueller et al.
9,843,399 B2  12/2017  Halbritter et al.
(Continued)

FOREIGN PATENT DOCUMENTS

CN  105765722 A  7/2016
CN  105814814 A  7/2016
(Continued)

OTHER PUBLICATIONS

Richard, C., et al., "Integration of hybrid optical filter with buried quad pn-junction photodetector for multi-labeling fluorescence detection applications," EDA Publishing/DTIP 2011, Aix-en Provience, France, May 11-13, 2011, 5 pages.
(Continued)

*Primary Examiner* — Sarah K Salerno
(74) *Attorney, Agent, or Firm* — Slater Matsil, LLP

(57) ABSTRACT

In an embodiment an optoelectronic apparatus includes a light detector having a bottom side, an upper side and at least one sidewall that extends between the upper side and the bottom side, a carrier having an upper surface on which the light detector is arranged such that the bottom side faces the carrier, at least one outer wall which is arranged on the surface of the carrier, the outer wall and the carrier forming a cavity with an opening in which the light detector resides, a filter covering the upper side of the light detector, the filter having a first threshold wavelength separating a first wavelength region from an adjacent second wavelength region, wherein the filter has a lower transmittance for light at wavelengths in the first wavelength region than for light at
(Continued)

wavelengths in the second wavelength region and a first material layer covering the filter.

17 Claims, 5 Drawing Sheets

(51) Int. Cl.
    *H10F 77/30*     (2025.01)
    *H10F 77/50*     (2025.01)

(56) References Cited

U.S. PATENT DOCUMENTS

| | | |
|---|---|---|
| 10,679,976 B2 | 6/2020 | Geiger |
| 2016/0240721 A1* | 8/2016 | Chu .................. G01J 1/0407 |
| 2019/0035947 A1 | 1/2019 | Wang |
| 2019/0267419 A1 | 8/2019 | Shen |

FOREIGN PATENT DOCUMENTS

| | | |
|---|---|---|
| DE | 102017111802 A1 | 12/2018 |
| WO | 2010103047 A1 | 9/2010 |

OTHER PUBLICATIONS

Richard, C., et al., "An integrated hybrid interference and absorption filter for fluorescence detection in lab-on-a-chip devices," The Royal Society of Chemistry 2009, www.rsc.org/loc, Lab on a Chip, Feb. 27, 2009, 6 pages.

* cited by examiner

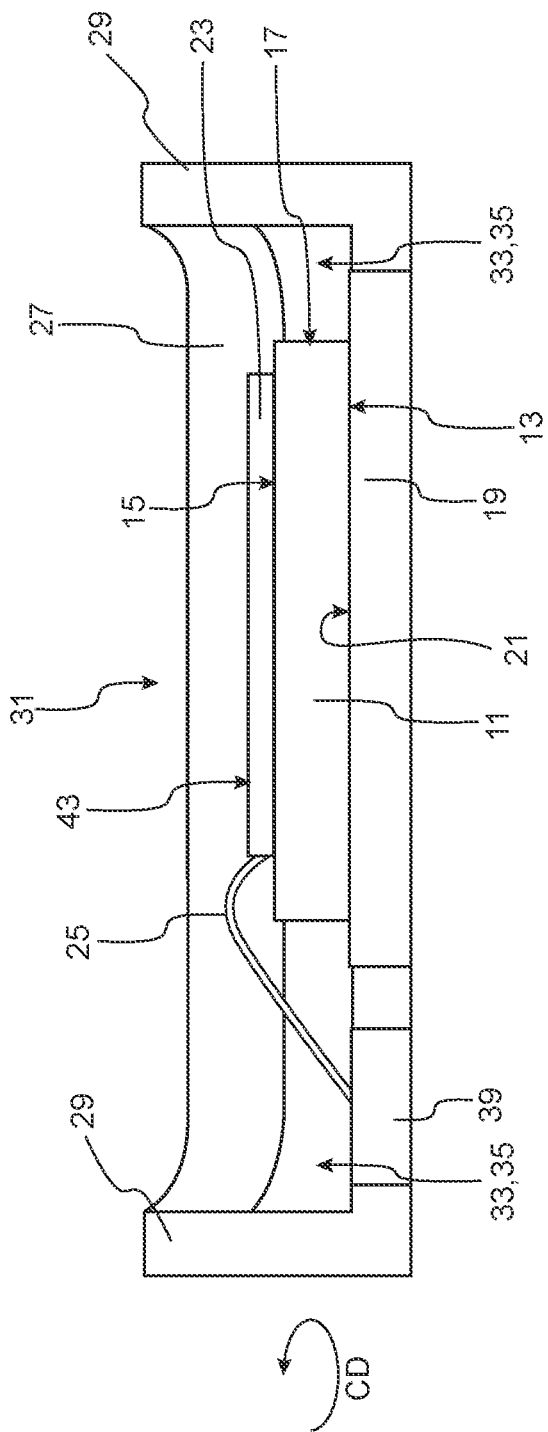
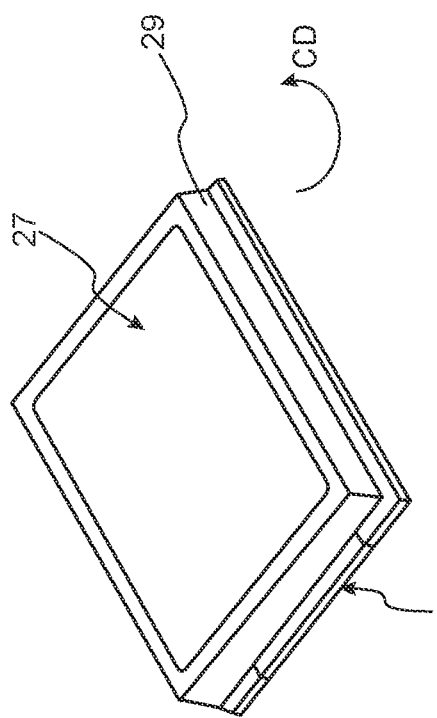
FIG. 1
FIG. 2

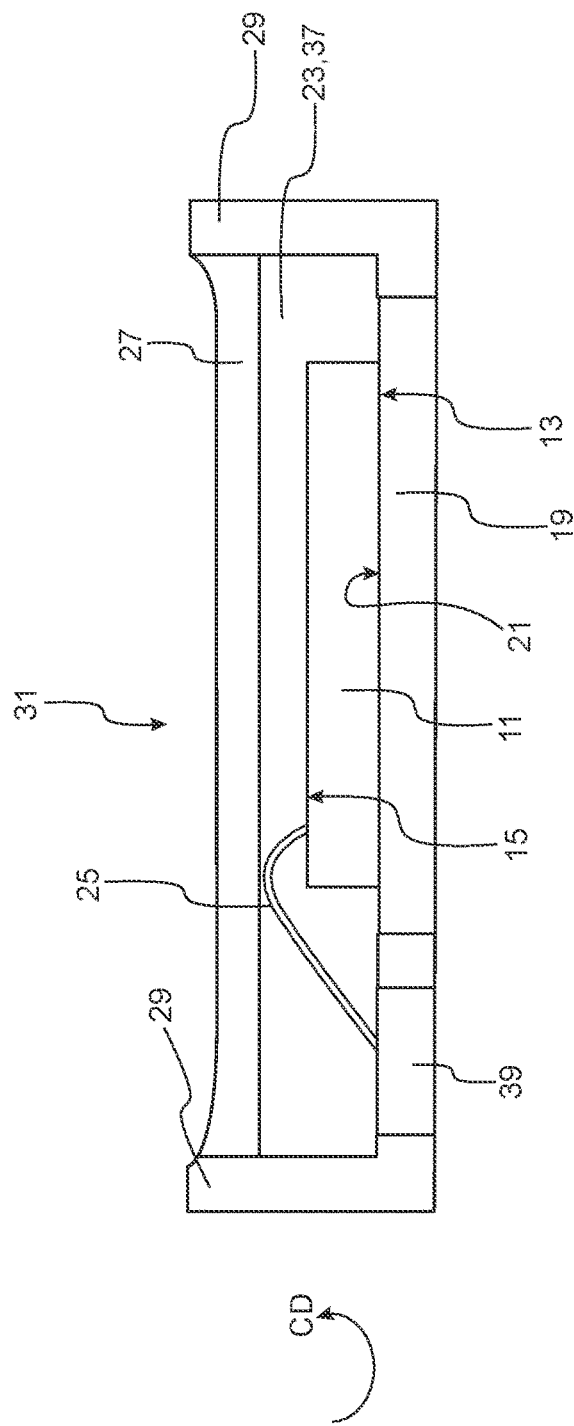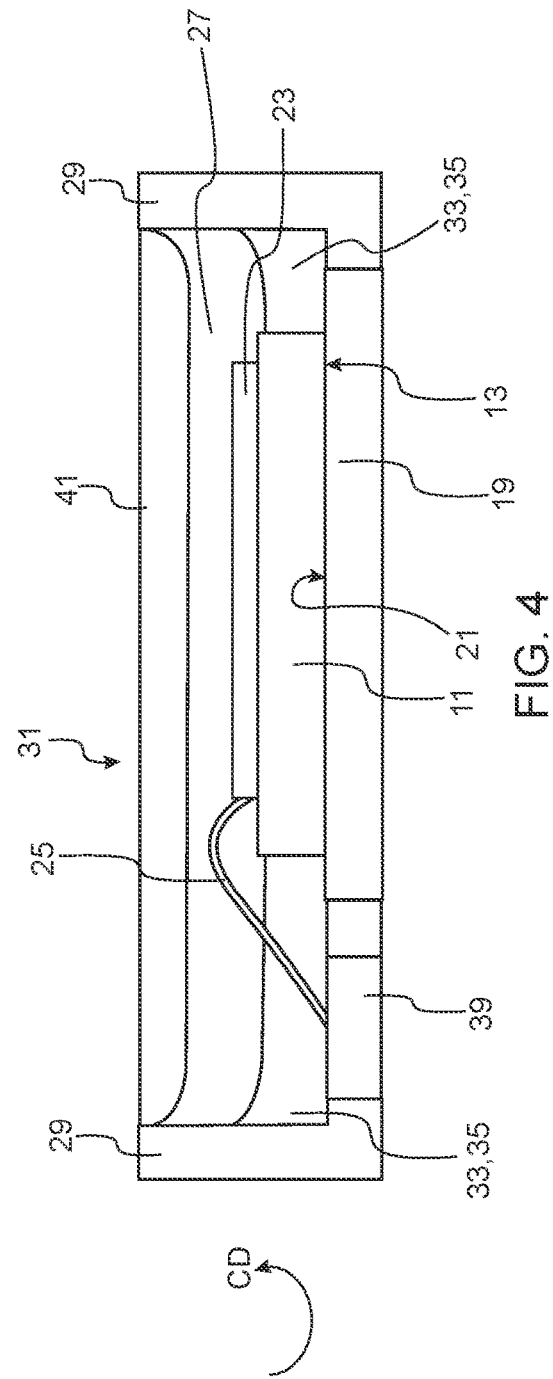

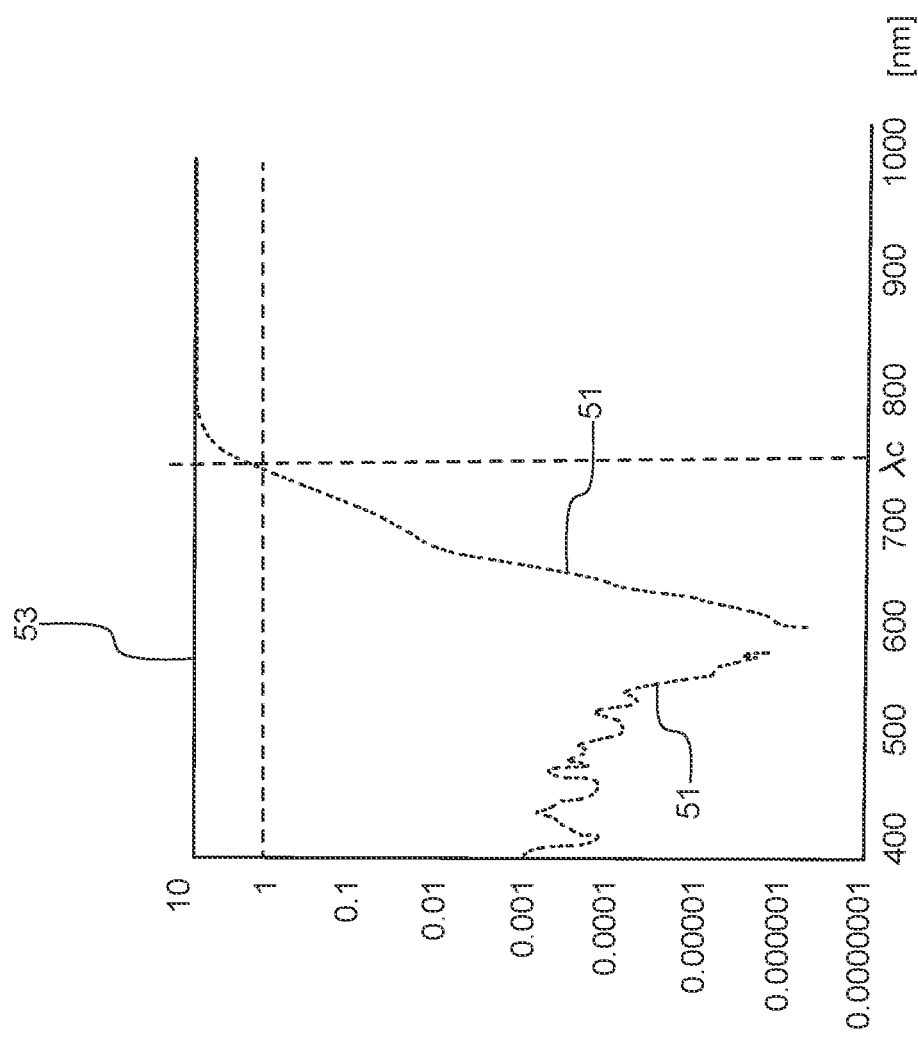

OPTOELECTRONIC APPARATUS

This patent application is a national phase filing under section 371 of PCT/EP2021/056700, filed Mar. 16, 2021, which claims the priority of German patent application 10 2020 203 805.8, filed Mar. 24, 2020, each of which is incorporated herein by reference in its entirety.

TECHNICAL FIELD

The present invention relates to an optoelectronic apparatus, in particular for detecting light. The present invention also relates to an optical system having at least one optoelectronic apparatus.

BACKGROUND

DE 10 2017 111 802 A1 discloses an optoelectronic apparatus comprising a semiconductor-based light detector having a bottom side, an upper side and a sidewall that extends between the upper side and the bottom side. The light detector is arranged in a cavity provided by a housing. A filter covers the upper side of the light detector. A blocking layer is arranged in the carrier such as to cover the sidewall of the light detector. A cast layer is furthermore arranged in the cavity on the filter and the blocking layer. The cast layer is transparent for the signal radiation that shall be detected by the light detector.

WO 2010/103047 A1 discloses an optoelectronic apparatus com-prising a light detector, a filter layer which covers a radiation entrance surface of the light detector, and a potting body which covers the light detector at least at the radiation entrance surface thereof, wherein the potting body contains a radiation-absorbing material.

Light detectors are employed in a plurality of possible ap-plications. However, for example, for spectroscopic applications, including luminescence, one has to deal with very low light signals coming from an investigated sample. Therefore a photodetector operating with very high signal to noise ratio is required to read with good accuracy the signal under investigation. In particular, stray light should be reduced as much as possible, because it can affect the accuracy of a measurement. This requirement can impose the use of filters aimed to maximize the optical transmission in the wavelength range of interest while the signals produced at other wave-lengths not coming from the samples shall be minimized.

SUMMARY

Embodiments provide an improved optoelectronic apparatus, in particular an optoelectronic apparatus which allows carrying out high performance measurements.

At least some embodiments in accordance with the present invention help to optimize the signal to noise ratio of a light detector, in particular at a package level.

At least in some embodiments in accordance with the present invention, an optoelectronic apparatus comprises a light detector having a bottom side, an upper side and at least one sidewall that extends between the upper side and the bottom side. The apparatus further comprises a carrier having an upper surface on which the light detector is arranged such that the bottom side faces the carrier. The apparatus also includes a filter which covers the upper side of the light detector. The filter has a first threshold wavelength separating a first wavelength region from an adjacent second wavelength region. Furthermore, the filter has a lower transmittance for light at wavelengths in the first wavelength region than for light at wavelengths in the second wavelength region. The apparatus also comprises a first material layer which covers the filter. The first material layer is configured to have a higher absorbance for light at wavelengths in a third wavelength region than for light at wavelengths in an adjacent fourth wavelength region. A second threshold wavelength separates the third and fourth wavelength regions from each other, and the first threshold wavelength at least approximately corresponds to the second threshold wavelength. In particular, the first threshold wavelength differs from the second threshold wavelength by at most ±20 nm, or by at most ±15 nm, or by at most ±10 nm, or by at most ±5 nm.

The light detector can be a photodiode, in particular a semiconductor photodiode.

The filter can for example be a longpass filter, and the first threshold wavelength can correspond to a cut-on wavelength of the longpass filter. The first wavelength region can then correspond to the stop band and the second wavelength region can relate to the wavelength region for which the longpass filter provides a high transmittance.

The filter, such as a longpass filter, can be realized in form of a dielectric filter. The filter can be integrated on the upper side of the light detector.

The transmittance of a filter, such as a dielectric filter, is usually dependent on the angle of incidence of the light. Some applications, for example, luminescence measurements, require the use of photodetectors, which are highly sensitive in one or more spectral bands with light impinging on the light detector in a wide range of angles from normal to grazing light incidence. In the disclosed apparatus, the first material layer is configured to have a high absorbance in the third wavelength region which can correspond at least in substance to the first wavelength region, while the fourth wavelength region with a high transmittance can correspond at least in substance to the second wavelength region.

The first material layer can compensate issues of the filter on the light detector by smoothening the wavelength dependence for large angles of incidence and allow reaching a very high light rejection in the stop band at the same time. For example, they can provide an optical density OD up to 5 or 6. Moreover, the first material layer and the filter can provide a combined transmittance, which is less sensitive to the angle of incidence of the impinging light.

A filter, such as an optical filter, and a first material layer, for example comprising epoxy or silicone with absorber particles acting as longpass filters, can be easily and cost-efficiently fabricated and processed. Thus, the apparatus can be fabricated in a cost-efficient way.

In some embodiments, the apparatus comprises at least one outer wall, which is arranged on the surface of the carrier. The outer wall and the carrier form a cavity with an opening. The light detector resides in the cavity, and light from the outside can enter the cavity through the opening. The carrier and the outer wall can form a housing having an opening on one side. The sidewall can have the cross-sectional form of a circular, square or rectangular ring.

In some embodiments, the outer wall extends at a distance in a circumferential direction around the at least one sidewall of the light detector.

The outer wall can be configured to absorb light, preferably light at wavelengths below and above the first threshold wavelength. Preferably, the outer wall is blackened or darkened. The amount of unwanted light that reaches the light detector through the sidewall can thereby be reduced or minimized. Crosstalk and the detection of unwanted light can be avoided or reduced.

A second material layer can be arranged between the first material layer and the carrier, and the second material layer can cover, in particular completely, the at least one sidewall of the light detector and/or the upper surface of the carrier.

The second material layer can be arranged in a volume formed by the first material layer, the upper surface of the carrier, and at least one outer wall which extends on the upper surface of the carrier in a circumferential direction around the at least one sidewall of the light detector.

In some embodiments, the second material layer is configured to absorb light, preferably light at wavelengths below and above the first threshold wavelength. The second material layer can for example consist of or comprise a highly absorbing casting material, for example a black casting material including epoxy or silicone. The second material layer can protect the sidewall of the light detector from spurious light absorption.

In some embodiments, the filter is formed by a third material layer which covers the upper side and the at least one sidewall of the light detector. The filter can for example be formed by a highly absorbing resist material, which can also occupy the volume and thus replace the second material layer of the previously described embodiments.

Preferably, the third material layer is the only layer which is arranged between the first material layer and the carrier. The third material layer can have a thickness which is larger than the height of the light detector.

A fourth material layer can be arranged above the first material layer. The fourth material layer can consist of or comprise a resist material. The fourth material layer can be dispensed on top of the first material layer, and it can completely cover the first material layer.

The fourth material layer can have a higher absorbance for light at wavelengths in a fifth wavelength region than for light at wavelengths in an adjacent sixth wavelength region, and a third threshold wavelength separates the fifth and sixth wavelength regions from each other, and the first threshold wavelength at least approximately corresponds to the third threshold wavelength.

The first threshold wavelength can differ from the third threshold wavelength by at most ±20 nm, or by at most ±15 nm, or by at most ±10 nm.

At least one of a first, second, third or fourth material layer and preferably all of the material layers cover completely the full length and width of the opening of the cavity which is formed by the carrier and the at least one outer wall.

In some embodiments, in the second wavelength region the filter and the first material layer have in combination a transmittance of at least 10%, 20%, 30%, 40%, 50%, 60%, 70%, 75%, or 80% with respect to the intensity of the incident light.

In some embodiments, the filter and the first material layer can have in combination a transmittance of less than 10%, 20%, 30%, 40%, 50%, 60%, 70%, 75%, or 80% in the first wavelength region.

The filter and the first material layer can act as a combined filter having a cut-on or cut-off wavelength, which is shifted with regard to the first threshold wavelength by at most 20 nm for angles of incidence in the range of 0° to 60° and by at most 30 nm for angles of incidence in the range of 0° to 90°.

The apparatus can comprise an optical diaphragm which is configured to reduce the angle of incidence on the upper side of the light detector to a maximum angle, such as 30°.

Embodiments of the described apparatus can be used for small footprint optical detectors. The filters of the detectors can be high optical density filters, for example longpass filters, and the detectors can have a significantly reduced dependency of the optical detection characteristics on the angle of incidence in a wide incidence range, even up to grazing incidence angles.

Moreover, embodiments of the described apparatus can provide a significant reduction of the absorption of stray light from the detector sidewalls.

Embodiments of the described apparatus can be implemented as low cost solutions, and they can be made compatible with miniaturization requirements for consumer grade applications.

Embodiments of the invention also relates to an optoelectronic system, such as a package module, which comprises one or more light sources, and one or more optoelectronic apparatuses in accordance.

In some embodiments, at least one of the light sources is configured to provide light having a wavelength in the first wavelength region.

In some embodiments, the one or more light sources do not provide light with a wavelength in the second wavelength region.

BRIEF DESCRIPTION OF THE DRAWINGS

In order that the invention may be more fully understood, exemplary embodiments thereof will now be described by way of example only, with reference to the accompanying drawings, in which:

FIG. 1 shows schematically a cross-sectional view of a first exemplary embodiment of an optoelectronic apparatus in accordance with embodiments of the present invention;

FIG. 2 shows schematically a perspective view of the optoelectronic apparatus of FIG. 1;

FIG. 3 shows schematically a cross-sectional view of a second exemplary embodiment of an optoelectronic apparatus in accordance with embodiments of the present invention;

FIG. 4 shows schematically a cross-sectional view of a third exemplary embodiment of an optoelectronic apparatus in accordance with embodiments of the present invention;

FIG. 7 shows an exemplary transmittance curve taking account of all incidence angles as a function of signal power in artificial units over wavelength in nanometer, and a curve showing the optical response of a stand-alone photodiode.

DETAILED DESCRIPTION OF ILLUSTRATIVE EMBODIMENTS

Figure 5:
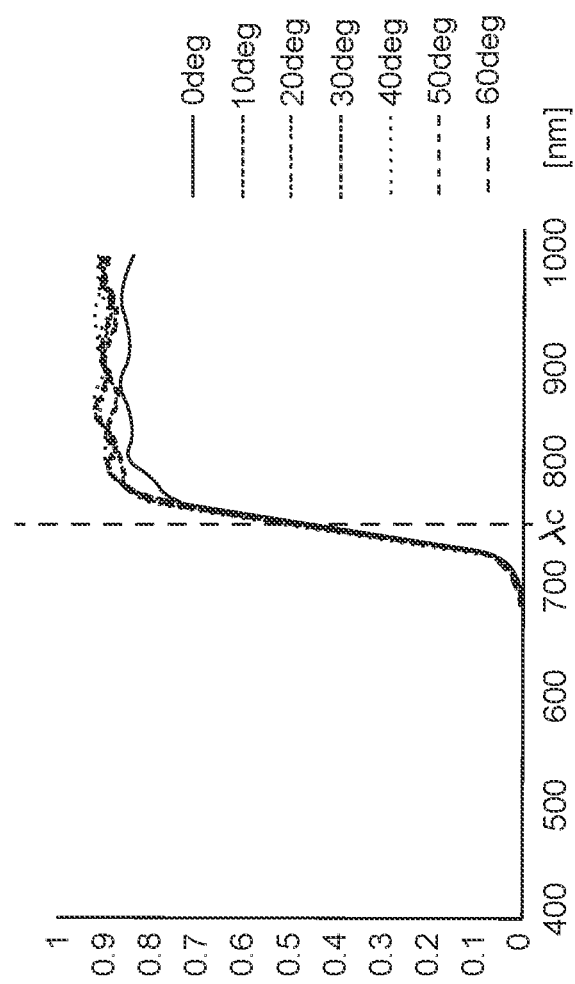
FIG. 5 shows transmittance curves as a function of normalized relative power over wavelength for different incidence angles using a linear scale on the y-axis.

The optoelectronic apparatus shown in FIGS. 1 and 2 comprises a light detector 11, such as a photodiode. The light detector 11 comprises a bottom side 13, an upper side 15 and at least one sidewall 17 that extends in a circumferential direction CD and between the upper side 15 and the bottom side 13.

The light detector 11 can be arranged in a housing. The housing can comprise the bottom side 13 and the sidewall 17, while at least a portion of the upper side 15 comprises an opening through which light can be incident on the light detector 11. Alternatively, the light detector 11 cannot have a housing. For example, the light detector 11 can be a chip, such as a photodiode chip, and the bottom side 13, the upper side 15 and the sidewall 17 can correspond to surfaces of the unhoused light detector 11.

The apparatus comprises a carrier 19, for example a lead frame, which has an upper surface 21. The light detector 11 is arranged on the carrier 19 such that the bottom side 13 of the light detector 11 rests on the upper surface 21 of the carrier 19.

A filter 23 is arranged on the upper side 15 such that it covers at least partially the upper side 15 of the light detector 11. For example, it covers a central portion of the upper side 15, but it does not cover a contact pad to which a bond wire 25 is connected. The bond wire 25 electrically connects the contact pad to an electric conductor 39 of the carrier 19.

The filter 23 can in particular be arranged to cover a light detection window (not shown) which is located on the upper side 15 and which serves as a detection area for incident light.

Furthermore, a first material layer 27 covers the filter 23, and the upper side 15 of the light detector 11.

As shown in FIGS. 1 and 2, the apparatus can comprise at least one outer wall 29, which is arranged on the upper surface 21 of the carrier 19 and which extends in a circumferential direction CD around the sidewall 17 of the light detector 11. In the shown example, the outer wall 29 has a cross-sectional shape of a square or rectangular ring.

The carrier 19 and the outer wall 29 form a cavity in which the light detector 11 resides and which has an opening 31 on the top. As shown in FIG. 1 the upper surface 21 of the carrier 19 forms the bottom of this cavity, and the first material layer 27 closes the opening 31 and extends over the entire length and width of the opening 31.

A second material layer 33 is arranged below the first material layer 27, in a volume 35 that is located between the first material layer 27, the carrier layer 19, the sidewall 17 of the light detector 11, and the outer wall 29. The second material layer 33 covers the sidewall 17 of the light detector 11. In some embodiments, the second material layer 33 covers completely the sidewall 17. The height of the second material layer 33 can then correspond to the height of the sidewall 17 of the light detector 11. Alternatively, as shown in FIG. 1, in some embodiments the first material layer 33 can cover a small top portion of the sidewall 17, while the second material layer 33 covers the major portion of the sidewall 17.

Some applications require the use of photodetectors, which are highly selective in one or more spectral bands. For example, in some applications, it is desirable to be able to detect light at a wavelength which is equal to or larger than a cut-off wavelength, while light at wavelengths shorter than the cut-off may disturb the detection and negatively affect the signal-to-noise ratio, so that its detection is undesirable.

The filter 23 is configured to have a first threshold wavelength which lies between a first wavelength region and an adjacent second wavelength region. Thus, the first threshold wavelength separates the first wavelength region from the second wavelength region. The filter can have a lower transmittance for light at wavelengths in the first wavelength region than for light at wavelengths in the second wavelength region.

In some embodiments, the filter 23 is a longpass filter and the first threshold wavelength corresponds to a cut-on wavelength at which the transmission increases to 50% throughput. The transmission in the first wavelength regions is lower than 50%, and the first wavelength region includes wavelengths that are lower than the first threshold wavelength. The transmission of the filter in the second wavelength region is higher than 50%, and the second wavelength region corresponds to wavelengths above the first threshold wavelength.

In some embodiments, the transmission function of the filter 23 in the wavelength region around the first threshold wavelength can have a high slope. The term slope can be used to specify the bandwidth in wavelength over which the filter transitions from high blocking to high transmission. For example, given as the percent of the cut-on wavelength, the slope can be defined from a variety of starting and end points. The slope might be specified as the distance from the 10% transmission point to the 90% transmission point. Using this definition, for example a 500 nm longpass filter with a 1% slope would be expected to transition from 10% transmission to 90% transmission over a 5 nm bandwidth, where the 5 nm corresponds to 1% of 500 nm.

In some embodiments, the filter 23 is a longpass filter and has a 5%, 2.5%, or 1% slope with regard to a predetermined first threshold wavelength.

The first material layer 27 is configured to have a higher absorbance for light at wavelengths in a third wavelength region than for light at wavelengths in an adjacent fourth wavelength region. A second threshold wavelength separates the third and fourth wavelength regions. The first threshold wavelength of the filter 23 at least approximately corresponds to the second threshold wavelength. Thus, the first threshold wavelength of the filter 23 and the second threshold wavelength of the first material layer 27 at least approximately match with each other.

Moreover, at least in some embodiments, the third wavelength region can correspond to the first wavelength region of the filter 23, and the fourth wavelength region can correspond to the second wavelength region of the filter 23. In the embodiments in which the filter 23 corresponds to a longpass filter, the first material layer 27 therefore can act as absorber for light at wavelengths in the third wavelength region. Such light, if not absorbed, is blocked by the filter 23. Moreover, the first material layer 27 absorbs far less light at wavelengths in the fourth wavelength region. Thus, the light for which the longpass filter 23 has a high transmittance is also not absorbed or at a far lower rate by the first material layer 27. The first material layer 27 may therefore help to improve the filtering functionality of the filter 23.

The filter 23, for example in form of a longpass filter, can be a dielectric filter that comprises multiple thin layers of dielectric and, optionally, metallic material having different refractive indices. The dielectric filter can have a thickness of around 10 μm. Alternatively, the longpass filter can be made of a resist material. The resist material can have a thickness of around 1 μm.

The properties of the filter 23 can be dependent on the angle of incidence of the light. As will be outlined further below with regard to FIGS. 5 to 7, the use of the first material layer 27 in combination with the filter 23 can be advantageous, as the first material layer 27 can compensate the dependency on the angle of incidence and thus improve the overall filtering properties.

The first material layer 27 can be made in form of a cast, using for example epoxy and/or silicone, which includes absorber materials, for example in form of particles. The absorber materials can be configured to provide the described properties of a higher absorbance in the third wavelength region than in the adjacent fourth wavelength region.

The first material layer 27 can for example have a thickness in the range of 200 μm to 300 μm.

The second material layer 33 is configured to absorb light at wavelengths below and above the first threshold wavelength in order to prevent light absorption at the sidewall 17 of the light detector 11, and/or to prevent light leakage through the package and/or the carrier 19. The second material layer 33 can be made in form of a cast, for example, comprising epoxy and/or silicone. Preferably, the cast comprises black filler material.

The second material layer 33 can have a thickness of for example 200 µm. In some embodiments, the thickness can be in a range of 200 µm to 300 µm. In some embodiments, the thickness is at least approximately equal to the thickness of the light detector 11.

The outer wall 29 is preferably blackened or darkened. The outer wall 29 therefore can also act as absorber.

In some embodiments, a clear resin (not shown) can be used between the light detector 11 and the filter 23 and the casting filter formed by the first material layer 27. The clear resin can have for example a thickness of 50 µm and can be transparent to the radiation both in the pass and stop bands of the filter 23 and the filter provided by the first material layer 27. Its function can be to avoid that the casting and filters lose their functionality when they are in touch with each other. The clear resin can act in this case as a sort of decoupling layer.

The apparatus as shown in FIG. 3 differs from the apparatus of FIGS. 1 and 2 in that the filter 23 consists of a third material layer 37 that also replaces the second material layer 33 that is not present in the embodiment of FIG. 3. The third material layer 37 can fully embed the light detector 11, and the thickness of the third material layer 37 is higher than the thickness of the light detector 11. For example, the thickness of the third material layer 37 can be 200 µm or more.

The apparatus as shown in FIG. 4 differs from the apparatus of FIGS. 1 and 2 in that it comprises an additional fourth material layer 41, for example of a thickness in the range of 1 to 100 µm. The fourth material layer 41 can be configured to have a higher absorbance for light at wavelengths in a fifth wavelength region than for light at wavelengths in an adjacent sixth wavelength region. A third threshold wavelength separates the fifth and sixth wavelength regions. The first threshold wavelength of the filter 23 can at least approximately correspond to the third threshold wavelength, and the fifth wavelength region can correspond to the first wavelength region, while the sixth wavelength region can correspond to the second wavelength region.

The fourth material layer 41 can be made from a resist material, and it can include absorber material particles that can be configured to provide the described properties of a higher absorbance in the fifth wavelength region than in the adjacent sixth wavelength region.

Each of the exemplary apparatuses as shown in FIGS. 1 to 4 comprises the filter 23 and the first material layer 27 that serve to detect light in the second wavelength region. The detection is in substance independent from the angle of incidence. Furthermore, the filter 23 and the first material layer 27 serve to avoid the detection of light in the first wavelength region. In addition, the darkened or blackened outer wall 29 as well as the absorbing second material layer 33 (for the embodiments of FIGS. 1, 2 and 4) serve to avoid detecting unwanted light, crosstalk and leakage of light into the apparatus.

Figure 6:
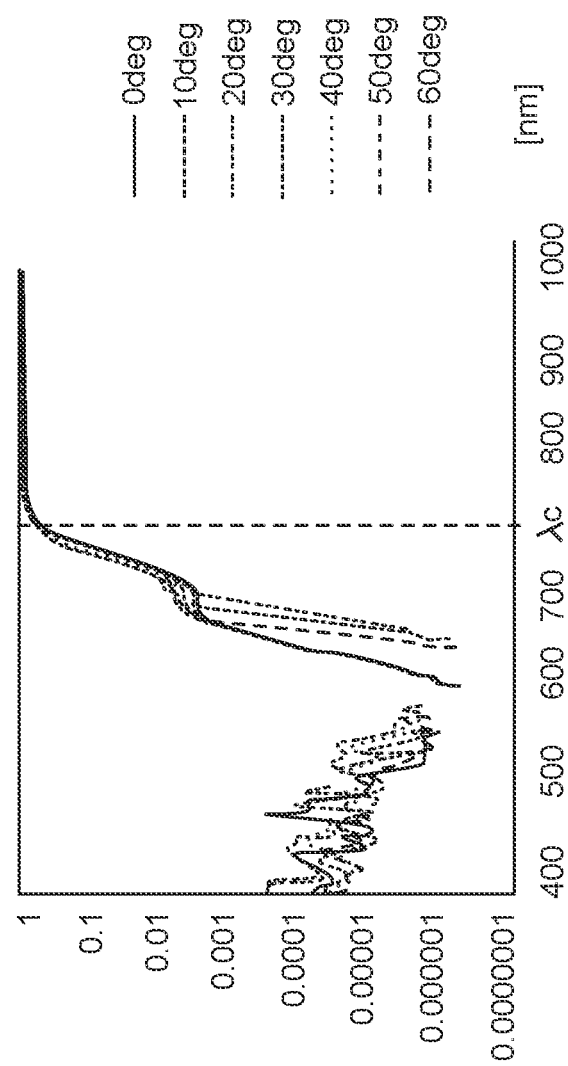
FIG. 6 shows the transmittance curves of FIG. 5 using a logarithmic scale on the y-axis.

FIG. 5 shows for the embodiment of FIGS. 1 and 2 calculated combined transmittance curves as a function of normalized relative power over wavelength for incidence angles of 0, 10°, 20°, 30°, 40°, 50°, and 60° using a linear scale on the y-axis. FIG. 6 shows the transmittance curves of FIG. 5 using a logarithmic scale on the y-axis. The incidence angles are measured with respect to a surface normal on the top surface 43 of the filter 23. The combined transmittance curves take the filtering properties of the filter 23 and the first material layer 27 into account.

FIGS. 5 and 6 show that the transmittance is low for wavelengths lower than the first threshold wavelength, here corresponding to the cut-on wavelength $\lambda_C \approx 750$ nm, but in substance independent of the angle of incidence. The wavelength region with wavelengths lower than $\lambda_C$ correspond to the first and third wavelength regions. Furthermore, FIGS. 5 and 6 show that the transmittance is high for wavelengths higher than $\lambda_C$. The small dependency on the angle of incidence is acceptable.

FIG. 7 shows for the embodiment of FIGS. 1 and 2 a calculated detection signal 51 as a function of signal power in artificial units over wavelength. The signal 51 takes account of all incident angles. FIG. 7 additionally shows a reference signal 53 of a stand-alone photodiode on which a corresponding filter 23 is deposited. FIG. 7 indicates that the detection signal 51 is up to a few orders of magnitude lower than the reference signal 53 for wavelengths below the cut-on wavelength $\lambda_C$. Furthermore, the detection signal 51 is at least approximately equal to the reference signal 53 for wavelengths above the cut-on wavelength $\lambda_C$.

The invention claimed is:

1. An optoelectronic apparatus comprising:
   a light detector having a bottom side, an upper side and at least one sidewall that extends between the upper side and the bottom side;
   a carrier having an upper surface on which the light detector is arranged such that the bottom side faces the carrier;
   at least one outer wall, which is arranged on the surface of the carrier, the outer wall and the carrier forming a cavity with an opening in which the light detector resides;
   a filter covering the upper side of the light detector, the filter comprising a first threshold wavelength separating a first wavelength region from an adjacent second wavelength region, wherein the filter has a lower transmittance for light at wavelengths in the first wavelength region than for light at wavelengths in the adjacent second wavelength region;
   a first material layer covering the filter, the first material layer comprising a second threshold wavelength separating a third wavelength region from an adjacent fourth wavelength region,
   wherein the first material layer has a higher absorbance for light at wavelengths in the third wavelength region than for light at wavelengths in the adjacent fourth wavelength region,
   wherein the first threshold wavelength differs from the second threshold wavelength by at most ±20 nm; and
   a second material layer comprising a highly absorbing casting material, the second material layer arranged between the first material layer and the carrier.

2. The optoelectronic apparatus of claim 1,
   wherein the filter is a dielectric filter or comprises a resist material, and/or
   wherein the first material layer comprises epoxy or silicone and absorber particles which act as a filter.

3. The optoelectronic apparatus of claim 1,
   wherein the outer wall extends at a distance in a circumferential direction around the at least one sidewall of the light detector, and/or wherein the outer wall is configured to absorb light at wavelengths below and above the first threshold wavelength, and/or wherein the outer wall is blackened or darkened.

4. The optoelectronic apparatus of claim 1, wherein the second material layer completely covers the at least one sidewall of the light detector and/or the upper surface of the carrier.

5. The optoelectronic apparatus of claim 4, wherein the second material layer is arranged in a volume formed by the first material layer, the upper surface of the carrier, and at least one outer wall which extends on the upper surface of the carrier in a circumferential direction around the at least one sidewall of the light detector.

6. The optoelectronic apparatus of claim 4, wherein the second material layer is configured to absorb light at wavelengths below and above the first threshold wavelength.

7. The optoelectronic apparatus of claim 1, wherein the filter is formed by a third material layer comprising a resist material, and wherein the third material layer covers the upper side and the at least one sidewall of the light detector.

8. The optoelectronic apparatus of claim 7, wherein the third material layer is arranged between the first material layer and the carrier, and/or wherein the third material layer is the only layer arranged between the first material layer and the carrier, and/or wherein the third material layer has a thickness that is larger than a height of the light detector.

9. The optoelectronic apparatus of claim 1, further comprising a fourth material layer comprising a resist, the fourth material layer arranged above the first material layer.

10. The optoelectronic apparatus of claim 9, wherein the fourth material layer has a higher absorbance for light at wavelengths in a fifth wavelength region than for light at wavelengths in an adjacent sixth wavelength region, wherein a third threshold wavelength separates the fifth and sixth wavelength regions from each other, wherein the first threshold wavelength at least approximately corresponds to the third threshold wavelength, and wherein the first threshold wavelength differs from the third threshold wavelength by at most ±20 nm.

11. The optoelectronic apparatus of claim 1, wherein at least one of the first material layer, the second material layer, a third material layer or a fourth material layer covers completely a full width and a full height of the opening of the cavity that is formed by the carrier and the at least one outer wall.

12. The optoelectronic apparatus of claim 1, wherein in the second wavelength region the filter and the first material layer have in combination a transmittance of at least 80% with respect to an intensity of an incident light, and/or wherein the filter and the first material layer have in combination a transmittance of less than 80% in the first wavelength region.

13. The optoelectronic apparatus of claim 1, wherein the filter and the first material layer act as a combined filter having a cut-on or cut-off wavelength that is shifted with regard to the first threshold wavelength by at most 20 nm for angles of incidence in a range of 0° to 60° and by at most 30 nm for angles of incidence in an angel of 0° to 90°.

14. The optoelectronic apparatus of claim 1, further comprising a clear resin arranged between the light detector and the filter and the first material layer.

15. A package module comprising:
one or more light sources; and
one or more optoelectronic apparatuses of claim 1.

16. The package module of claim 15, wherein at least one of the light sources is configured to provide light having a wavelength in the first wavelength region, and/or wherein the one or more light sources do not provide light with a wavelength in the second wavelength region.

17. The optoelectronic apparatus of claim 1, wherein the second material layer completely covers the at least one sidewall of the light detector.

* * * * *